United States Patent [19]

Tomlinson

[11] 3,950,567
[45] Apr. 13, 1976

[54] METHOD OF MAKING A POPCORN CONFECTION
[76] Inventor: Barnard E. Tomlinson, 632 S. 12th St., Walla Walla, Wash. 99362
[22] Filed: Aug. 8, 1972
[21] Appl. No.: 278,732

[52] U.S. Cl. ................................ 426/625; 426/660
[51] Int. Cl.² ..................... A23G 3/00; A23L 1/18
[58] Field of Search ............ 99/83, 138 S, 138, 134, 99/171 H; 426/162, 168, 214, 625, 660

[56] References Cited
UNITED STATES PATENTS

| | | | |
|---|---|---|---|
| 2,160,730 | 5/1939 | Hackett | 99/138 S |
| 2,355,031 | 8/1944 | Musher | 426/162 |
| 2,694,643 | 11/1954 | Robinson | 426/168 |
| 3,204,760 | 9/1965 | Whiteford | 99/171 H |
| 3,407,078 | 10/1968 | Schlichter | 426/394 |

*Primary Examiner*—Jeanette M. Hunter
*Attorney, Agent, or Firm*—Seed, Berry, Vernon & Baynham

[57] ABSTRACT

Preparing a non-sticky popcorn ball confection by cooking a confection including sweetener, fat, water and gelatin which may be prepackaged and later used by merely heating in the package, pouring the cooked confection over popped popcorn and forming balls.

2 Claims, No Drawings

METHOD OF MAKING A POPCORN CONFECTION

BACKGROUND OF THE INVENTION

1. Field of the Invention

This invention relates to a non-sticky taffy composition and method of use.

2. Prior Art Relating to the Disclosure

The standard recipe for the confection for popcorn balls comprises sugar and/or corn syrup, water, salt and vanilla. The sugar, corn syrup and water are cooked to the crack stage, the salt and flavoring are added, and the resulting hot sticky confection is poured over a batch of popped corn which is then divided and manually formed into balls. Even if hands are precoated with margarine or other fat, because of the tackiness of the confection, difficulty is frequently experienced in preventing the confection from adhering to the fingers as the balls are formed. A typical prior art popcorn ball confection for 6 quarts of popped corn is as follows:

| | |
|---|---|
| Sugar | 2 cps. |
| Corn Syrup | ⅔ cp. |
| Water | 2 cps. |
| Salt | ½ tsp. |
| Vanilla | 2 tsps. |

SUMMARY OF THE INVENTION

The present invention aims to provide an improved popcorn ball confection which can be completely constituted and prepackaged for later use, and which can be easily and conveniently stored, heated, handled and applied to the popcorn without adhering to the hands.

DESCRIPTION OF THE PREFERRED EMBODIMENT

In carrying out the invention I utilize gelatin and fat as ingredients in addition to those which have in the past been found in most popcorn ball confection recipes. The gelatin is utilized to keep the confection in a soft pliable state prior to use much in the manner that it does in marshmallows. In fact, marshmallows can be utilized to provide all of the ingredients but the fat and part of the sugar. The fat may be provided as butter, margarine or some other suitable substitute.

A typical recipe for the confection of the present invention to use with about 12-14 quarts of popped corn is as follows:

| | |
|---|---|
| Gelatin | ¾ oz. |
| Margarine | ¼ lb. |
| Sugar | 2½ cps. |
| Corn syrup (glucose) | 1½ cps. |
| Corn starch | 1 oz. |
| Water | ⅔ cp. |
| Salt | 2 tsps. |
| Vanilla extract | 2 tsps. |
| Citric acid and a flavor extract may be added if desired. | |

To prepare the confection the gelatin is thoroughly mixed in two-thirds cup of cold water and the water heated to dissolve the gelatin to this 1 cup of sugar is added and the heat increased to bring the mixture to a rolling boil whereupon it is removed from the burner and 1½ cups glucose and 1 oz. corn starch added and well mixed and cooked to 200°F. One-fourth lb. of margarine is then added and the mixture allowed to cool. The remainder of the ingredients are then added. Desired special flavoring or coloring may be inserted at this time.

The resulting confection is packaged and cooled for storage. It is preferred to use heat resistant transparent envelopes or pouches for storage of the type which can be heat-sealed and later subjected to boiling water without damaging, such for example as the polystyrene pouches of about 2 mil film thickness commonly used for storage and cooking of frozen vegetables. The confection may be packaged before or after cooling. When at room temperature it is soft and pliable much like putty.

To prepare the packaged confection for use while the popcorn is being popped the closed pouch of confection is placed in a pan of boiling water and heated until the confection has a consistency suitable for pouring. After removal from the pan the heated pouch is cut open at one end or corner and the confection conveniently poured therefrom directly onto the freshly popped corn while the corn is stirred to well mix the hot confection with the corn. Then handfulls of the confection laden popcorn are shaped into balls in the normal manner or molded in other fashion. However, during this ball forming operation the fat present in the confection prevents sticking thereof to the fingers.

In the above described recipe the amounts of sugar and glucose may be varied somewhat for individual taste and the cooking starch is not essential. The gelatin and much of the sugar and glucose may be provided by marshmallows of the conventional type made from corn syrup, sugar, gelatin and albumin.

It is believed that the invention will have been clearly understood from the foregoing detailed description of my now-preferred illustrated embodiment and it is my intention that the hereto annexed claims be given the broadest interpretation to which the employed language fairly admits.

The embodiments of the invention in which an exclusive property or privilege is claimed are defined as follows:

1. A process for making popcorn balls, comprising:
   the steps of providing a cooked confection composition which when applied to popcorn does not adhere to the hands, said composition consisting essentially of fat, sweetener, water and gelatin, said sweetener exceeding the water in weight and wherein said gelatin is in an amount sufficient to keep the confection composition in a soft pliable state prior to use:
   sealing a portion of the confection composition into a thin, synthetic plastic container adapted to withstand the temperature of boiling water,
   placing the sealed container in boiling water to heat the confection composition to thin syrup consistency,
   opening the container,
   pouring the composition over popped popcorn, and forming the confection-coated popped popcorn into popcorn balls.

2. A process according to claim 1 in which said container is formed from polystyrene material.

* * * * *